(12) United States Patent
Weiher

(10) Patent No.: US 8,708,165 B2
(45) Date of Patent: Apr. 29, 2014

(54) APPARATUS CONFIGURED TO STORE MEDIA CASES AND BOXES

(76) Inventor: John M. Weiher, Toledo, OH (US)

(*) Notice: Subject to any disclaimer, the term of this patent is extended or adjusted under 35 U.S.C. 154(b) by 10 days.

(21) Appl. No.: 13/374,558

(22) Filed: Dec. 31, 2011

(65) Prior Publication Data

US 2012/0175327 A1    Jul. 12, 2012

Related U.S. Application Data

(60) Provisional application No. 61/429,232, filed on Jan. 3, 2011.

(51) Int. Cl.
| | | |
|---|---|---|
| *A47G 29/00* | (2006.01) | |
| *A47F 5/08* | (2006.01) | |
| *B42F 17/02* | (2006.01) | |
| *A47F 5/00* | (2006.01) | |
| *A47B 81/06* | (2006.01) | |
| *G11B 33/04* | (2006.01) | |
| *B65D 21/02* | (2006.01) | |

(52) U.S. Cl.
CPC .......... *A47B 81/068* (2013.01); *G11B 33/0483* (2013.01); *G11B 33/0461* (2013.01); *A47B 81/067* (2013.01); *A47F 5/005* (2013.01); *B42F 17/02* (2013.01); *B65D 21/0204* (2013.01); *G11B 33/045* (2013.01)
USPC ............. 211/40; 211/87.01; 211/51; 211/184

(58) Field of Classification Search
CPC ........... G11B 23/0236; G11B 15/6825; G11B 33/0483; G11B 33/0461; G11B 33/0411; G11B 33/0438; G11B 33/0422; G11B 33/0444; G11B 33/0433; G11B 33/0466; G11B 33/04; G11B 33/0405; G11B 33/045; A47B 87/02; A47B 81/068; A47B 81/067; A47B 57/58; A47B 57/583; A47B 57/588; A47B 63/00; A47B 65/00; A47F 5/0846; A47F 7/14; A47F 7/146; A47F 5/0807; A47F 5/08; A47F 5/005; B42F 17/02; B42F 17/08; B65D 21/0204; B65D 1/30; B65D 21/0202; B65D 81/361; B65D 1/36
USPC ........ 211/40, 41.12, 71.01, 194, 49.1, 42, 43, 211/184, 86.01, 87.01, 10, 11, 126.13, 50, 211/51; 206/308.1, 308.3; 220/23.2, 23.4, 220/23.6, 23.8; 312/107, 9.1, 9.53, 9.55, 312/9.56, 9.54
See application file for complete search history.

(56) References Cited

U.S. PATENT DOCUMENTS

| | | | | |
|---|---|---|---|---|
| 4,709,813 A | * | 12/1987 | Wildt | 206/308.2 |
| 4,821,885 A | * | 4/1989 | Ondrasik | 206/513 |
| 5,078,278 A | * | 1/1992 | Edmark | 211/40 |
| 5,191,983 A | * | 3/1993 | Hardy | 211/40 |
| 5,314,152 A | * | 5/1994 | Troy et al. | 248/146 |
| 5,577,620 A | * | 11/1996 | Jacob | 211/40 |
| 5,634,563 A | * | 6/1997 | Peng | 211/40 |
| 5,647,487 A | * | 7/1997 | Reinhard | 211/40 |
| 5,685,439 A | * | 11/1997 | Luenser | 211/183 |
| 5,715,948 A | * | 2/1998 | Hung | 211/40 |
| 5,746,325 A | * | 5/1998 | Lee | 211/40 |

(Continued)

*Primary Examiner* — Jennifer E Novosad
(74) *Attorney, Agent, or Firm* — MacMillan, Sobanski & Todd, LLC

(57) ABSTRACT

An improved apparatus configured to store different kinds and types of media cases and boxes includes at least two similar constructed apparatuses which are releasably connected together by at least one pair of mating connecting members.

18 Claims, 9 Drawing Sheets

(56) References Cited

U.S. PATENT DOCUMENTS

Figure 1:
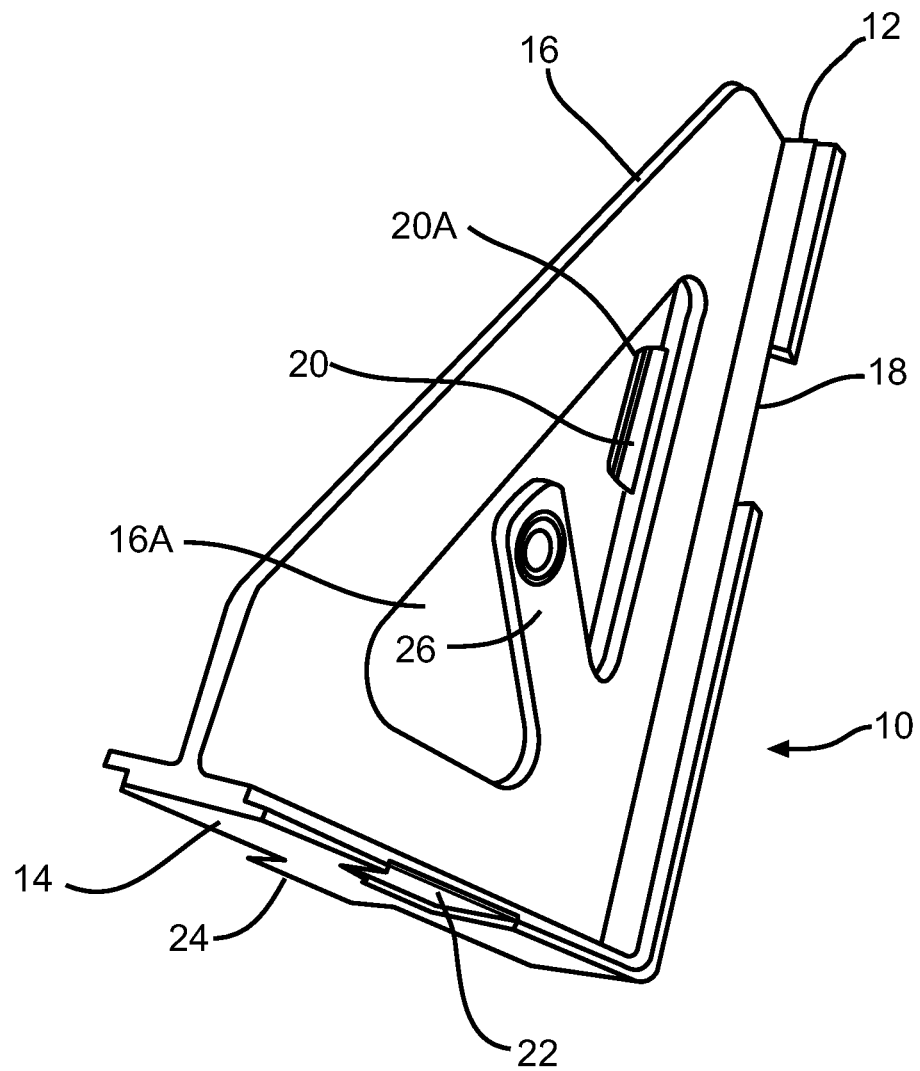

| | | | |
|---|---|---|---|
| 5,853,091 A * | 12/1998 | Luenser | 211/40 |
| 5,865,320 A * | 2/1999 | Hamada | 211/40 |
| 5,921,404 A * | 7/1999 | Cooke et al. | 211/40 |
| 5,931,315 A * | 8/1999 | Lorentz et al. | 211/40 |
| 6,007,167 A * | 12/1999 | Cohen | 312/9.48 |
| 6,059,123 A * | 5/2000 | Cotutsca | 211/40 |
| 6,089,384 A * | 7/2000 | Watson et al. | 211/40 |
| 6,112,910 A * | 9/2000 | Baxter | 211/40 |
| 6,431,354 B1 * | 8/2002 | Irisawa | 206/309 |
| 6,523,700 B2 * | 2/2003 | Nadeau | 211/40 |
| 6,705,472 B2 * | 3/2004 | Cross et al. | 211/40 |
| 6,863,186 B2 * | 3/2005 | Caplan et al. | 211/40 |
| 6,902,070 B2 * | 6/2005 | Taylor et al. | 211/40 |
| 8,011,503 B2 * | 9/2011 | Hartman | 206/308.1 |
| 2002/0066705 A1 * | 6/2002 | Chow et al. | 211/40 |
| 2002/0139761 A1 * | 10/2002 | Nadeau | 211/40 |
| 2004/0182800 A1 * | 9/2004 | Poirier | 211/40 |
| 2005/0023232 A1 * | 2/2005 | Henk | 211/43 |
| 2006/0021954 A1 * | 2/2006 | Lin | 211/40 |
| 2006/0124480 A1 * | 6/2006 | Menard | 206/308.1 |
| 2006/0185994 A1 * | 8/2006 | Schuurs | 206/308.1 |
| 2009/0127143 A1 * | 5/2009 | Jones et al. | 206/308.1 |

* cited by examiner

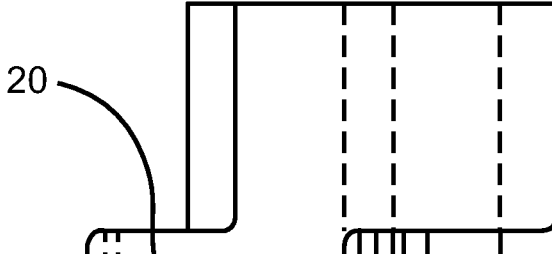
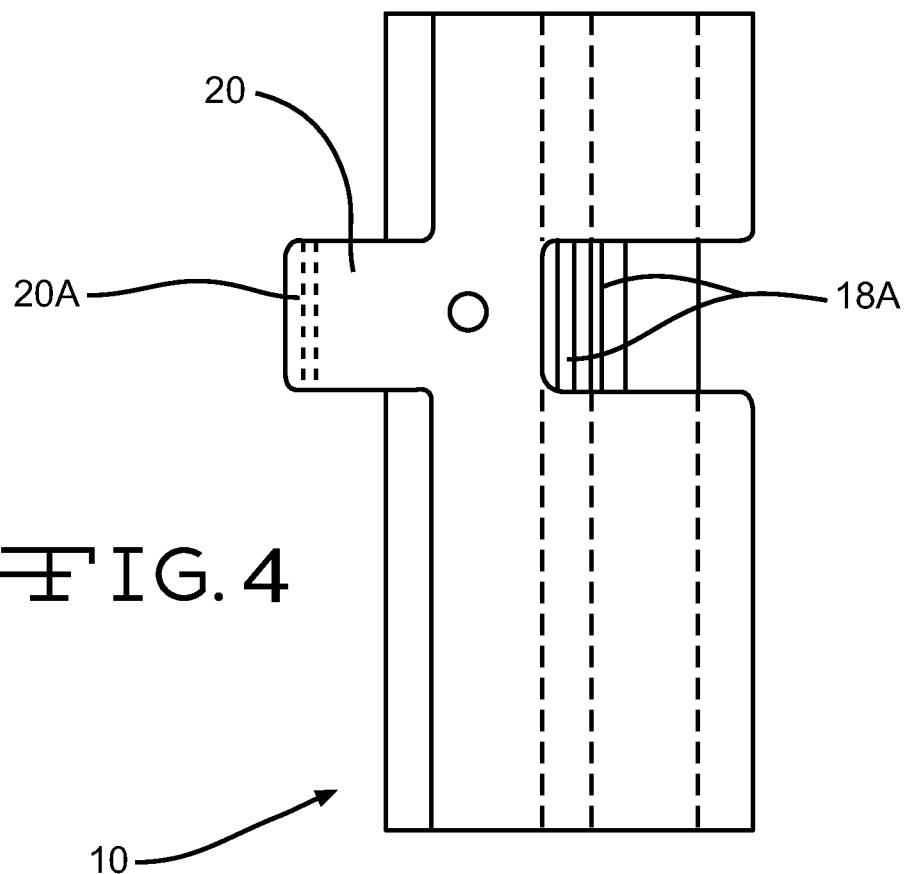
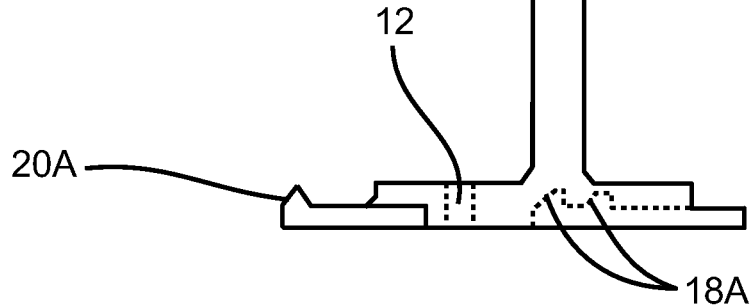

Section of snap

Section "AA"

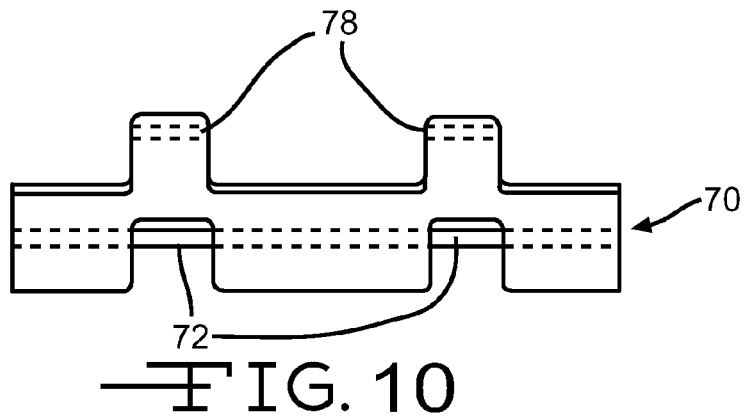
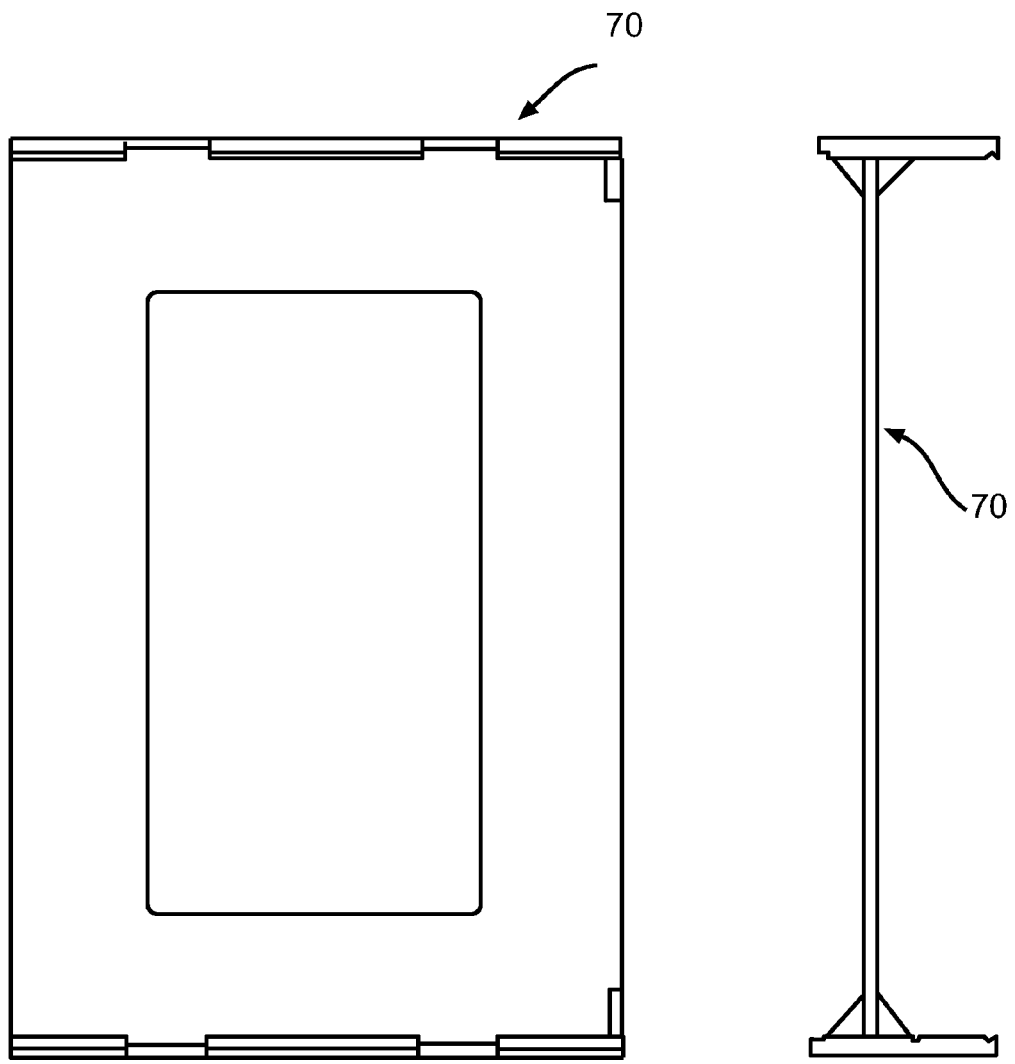
FIG. 10
FIG. 11
FIG. 12

US 8,708,165 B2

APPARATUS CONFIGURED TO STORE MEDIA CASES AND BOXES

CROSS-REFERENCE TO RELATED APPLICATIONS

This application claims the benefit of provisional patent application Ser. No. 61/429,232 filed Jan. 3, 2011.

BACKGROUND

Prior Art

This invention relates in general to Media storage cases and in particular to an improved apparatus to store different kinds and types of media cases and boxes for audio and or video media.

| U.S Patent Documents | | |
|---|---|---|
| 5,078,278 | Jan. 7, 1992 | John Edmark |

DRAWINGS

Figures

In the drawings, closely related features have the same number but different alphabetic suffixes.

Figure 2:
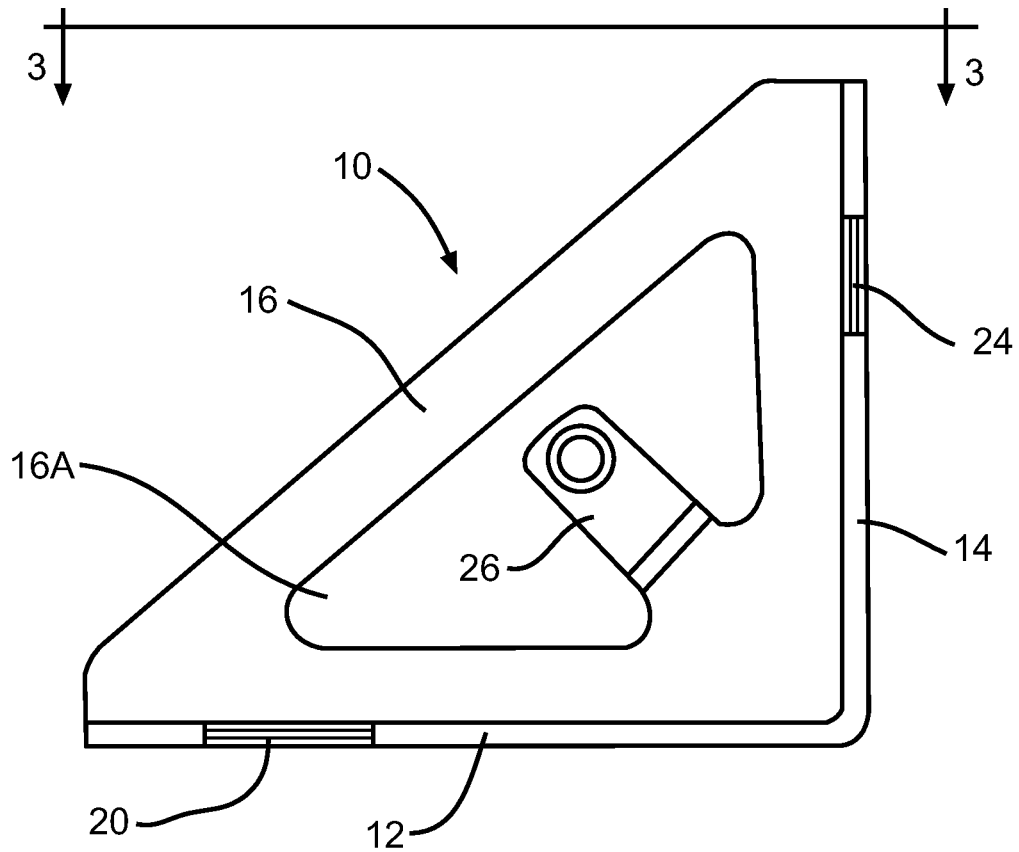
Figure 3:
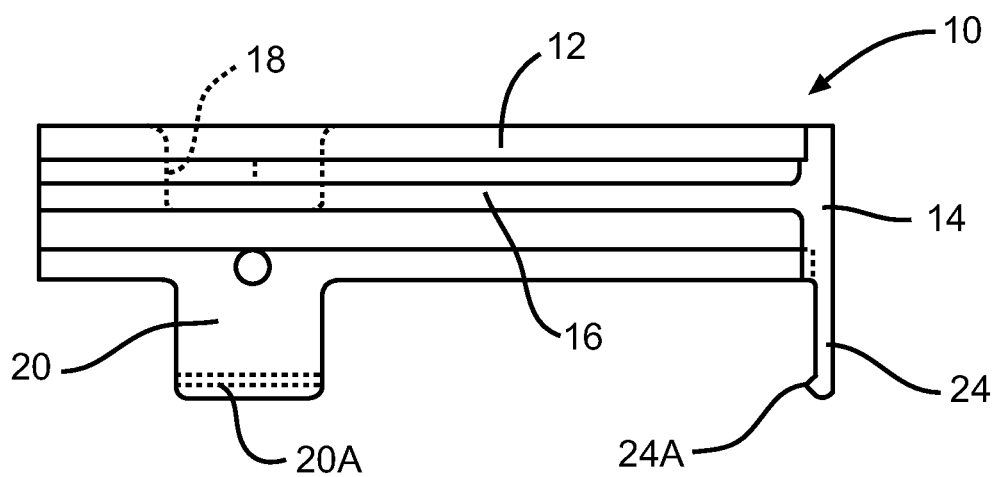
Figure 6:
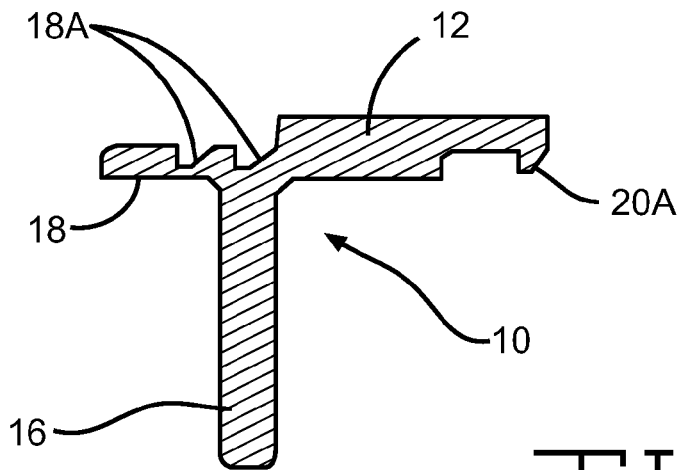
Figure 7:
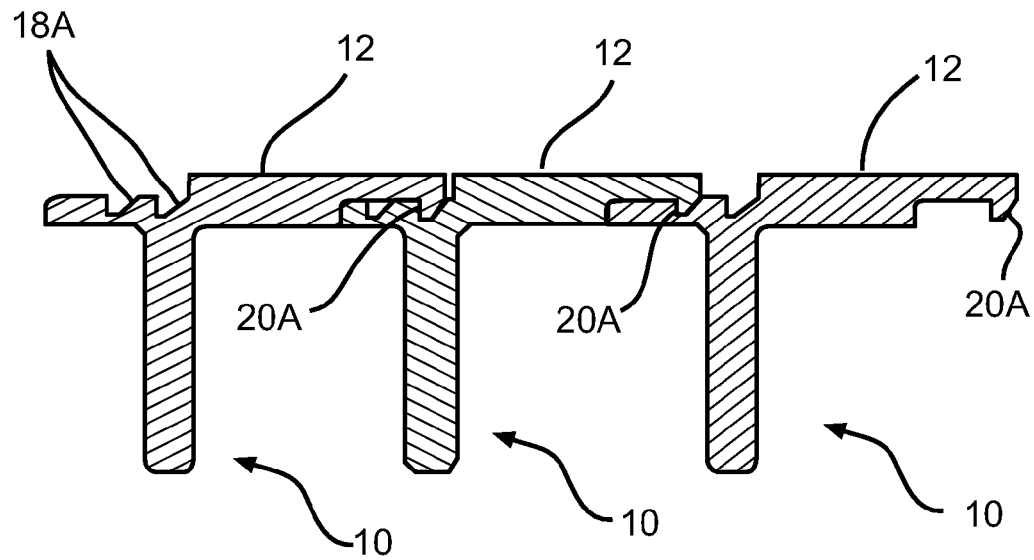
Figure 8:
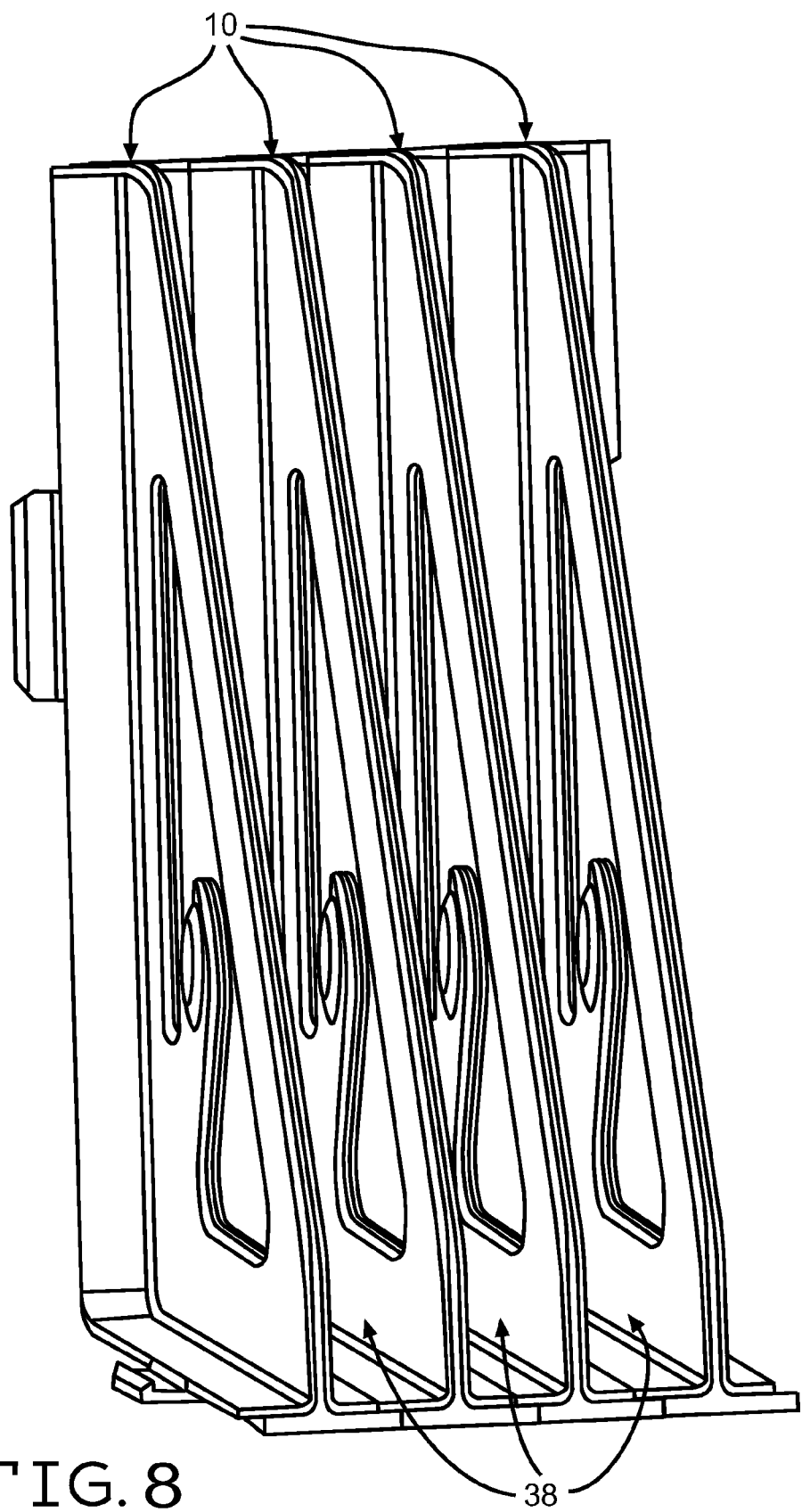
Figure 8A:
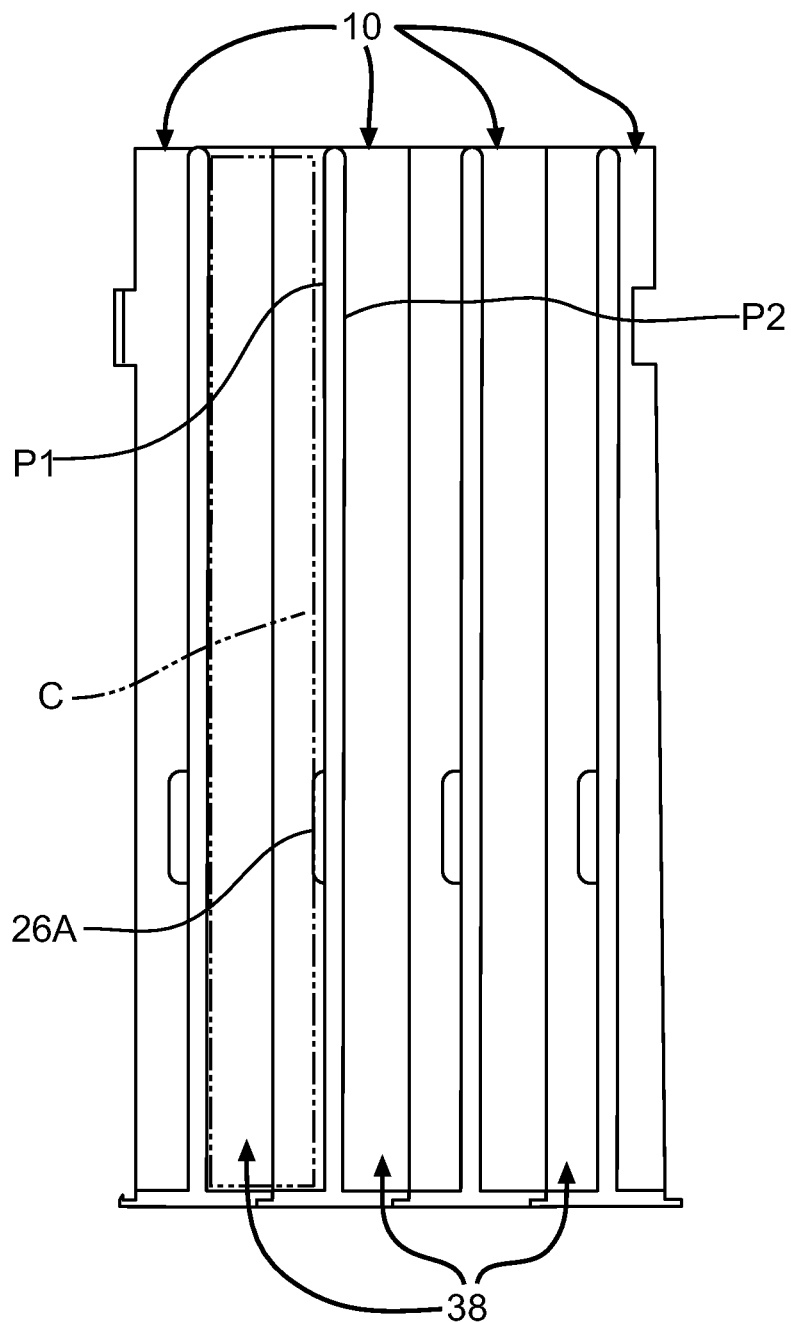
Figure 9:
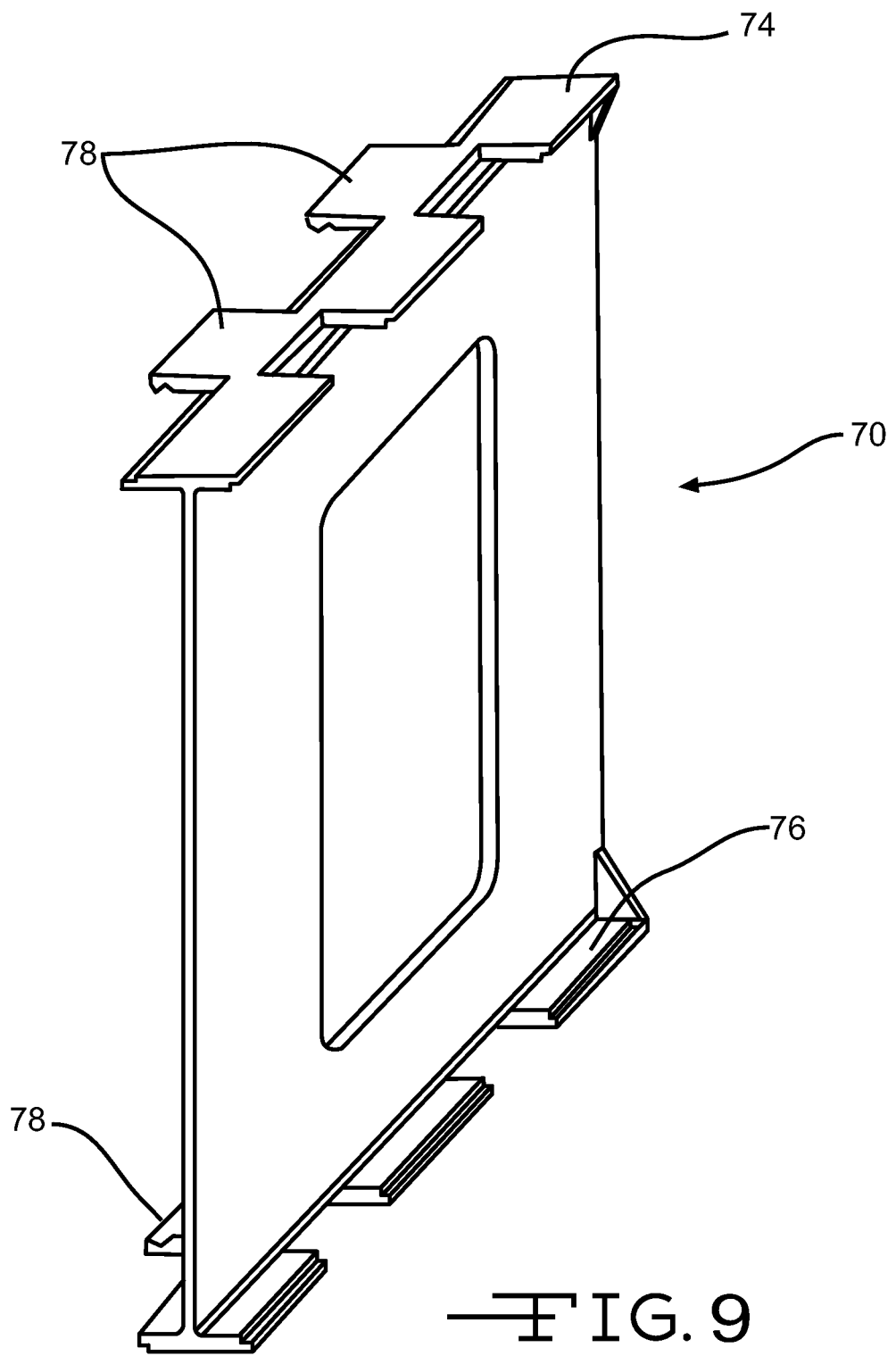
Figure 13:
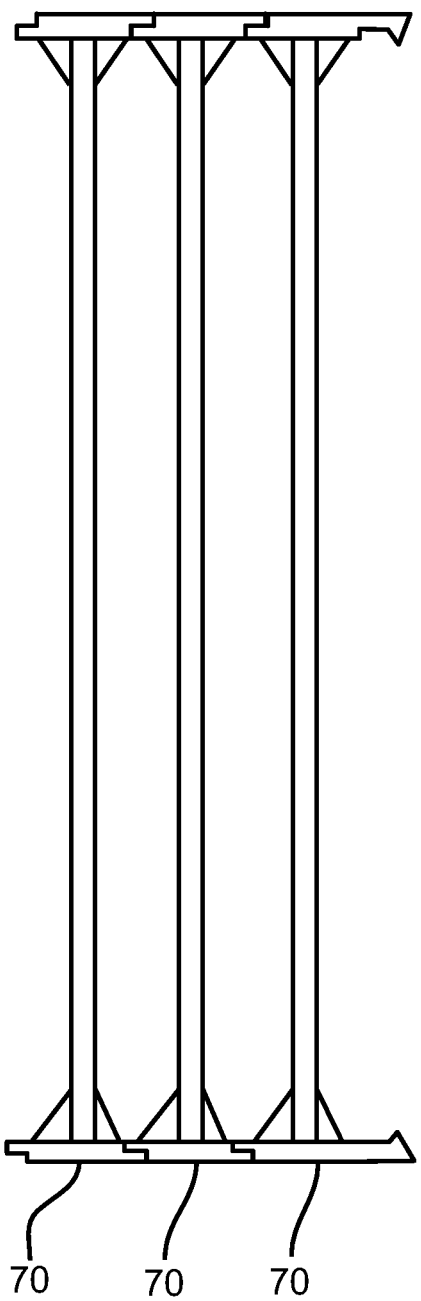

FIG. 1 is a perspective drawing of a first embodiment of the modular unit according to the invention;
FIG. 2 is a side view of the modular unit;
FIG. 3 is the top view of the modular unit;
FIG. 4 is the bottom view of the modular unit;
FIG. 5 is a partial view from the front of the first wall showing the snap detail;
FIG. 6 is a section view from the top through the snap feature of the second wall;
FIG. 7 is a section through an assembly of 3 modular units at the snap feature;
FIG. 8 is a perspective view of 4 assembled modular units;
FIG. 8A is a front view of 4 assembled modular units;
FIG. 9 is a perspective view of a second embodiment of the modular unit;
FIG. 10 is a top view of the second embodiment;
FIG. 11 is a side view of the second embodiment;
FIG. 12 is a front view of the second embodiment;
FIG. 13 is a front view of 3 assembled modular units of the second embodiment;

| DRAWINGS----REFERENCE NUMERALS | |
|---|---|
| 10 | First Modular Embodiment |
| 12 | First Wall or Bottom Wall |
| 14 | Second Wall or Side Wall |
| 16 | Main Body Portion |
| 16A | Opening in Main Body Portion |
| 18 | First Female Connection Portion |
| 18A | First Set of Depressed Detents |
| 20 | First Male Connection Portion |
| 20A | First Angled Snap Tab |
| 22 | Second Female Connection Portion |
| 22A | Second set of Depressed Detents |
| 24 | Second male Connection Portion |
| 24A | Second Angled Snap Tab |
| 26 | Spring Retention Tab |

| DRAWINGS----REFERENCE NUMERALS | |
|---|---|
| 38 | Receiving Space for Cases and Boxes |
| 70 | Second Modular Embodiment |
| 72 | Female Connection Portion |
| 74 | Upper Wall |
| 76 | Lower Wall |
| 78 | Male Connection Portion |

DETAILED DESCRIPTION OF THE INVENTION

Referring now to FIGS. 1-8, there is illustrated various views of a first embodiment of an apparatus of member, indicated generally at 10, which when it is connected to at least one similar constructed apparatus 10, provides a modular storage rack unit which is configured to store different kinds and types of media cases and boxes in accordance with the present invention. Typical media cases and boxes may include but are not limited to cases or boxes may include but are not limited to cases or boxes for DVD's, CD's, Blu-rays, movies, audio, video games, VHS tapes and the like. Although the invention will be illustrated and described as for use with a particular case or box, i.e., DVD's, it can be appreciated that the invention is readily or easily modified or configured to properly hold other kinds or types of media (or non-media) cases and boxes according to the underlying feature of the present invention.

As shown therein, in the illustrated embodiment the apparatus 10 is formed of a suitable material, such as for example plastic, and is generally triangular shaped and includes a first or bottom wall 12, a second or side wall 14 and a third or main body portion 16. The first wall 12 includes a first opening or first "female snap-lock" connection portion 18 located on a first "stepped wall" or side 12A thereof and a first extension or first "male snap-lock" connecting portion 20 located on a second opposite "stepped wall" or side 12B thereof. In the illustrated embodiment, the first connection portion 18 includes at least one and more preferably is provided with a pair of recesses or detents 18A formed therein (in order to accommodate two different widths of media cases and boxes), and the first connecting portion 20 is preferably provided with a raised "angled snap" tab 20A. Alternatively, the construction and/or configuration of the first wall 12 of the apparatus 10 can be other than illustrated and described if so desired.

Similarly, in the illustrated embodiment the second wall 14 includes a first opening or first "female snap-lock" connection portion 22 located on a first "stepped wall" or side 14A thereof and a first extension or first "male snap-lock" connecting portion 24 located on a second opposite "stepped wall" or side 14B thereof. In the illustrated embodiment, the first connection portion 22 includes at least one and more preferably is provided with a pair of recesses or detents 22A formed therein (in order to accommodate two different widths of media cases and boxes), and the first connecting portion 24 is preferably provided with a raised "angled snap" tab 24A. Alternatively, the construction and/or configuration of the second wall 14 of the apparatus 10 can be other than illustrated and described if so desired.

In the illustrated embodiment, the main body portion 16 is generally triangular shaped and includes an opening 16A provided therein. Also, as shown in FIG. 2, the main body portion 16 may be provided with a "spring biased retention" tab or member 26 which extends from the main body portion 16 and into the opening 16A and which in operation is deflectable and effective to assist in holding or securing the associated media case or box (as shown in phantom in FIG. 8A at reference character C), within the apparatus 10 during transport and/or movement thereof. As best shown in FIG. 8A, the main body portion 16 defines a first plane surface P1 on a first side thereof and a second plane surface P2 defined on a second side thereof which is generally parallel to the first plane surface P1, and a raised protuberance 26A provided on the retention tab 26 extends outwardly and beyond one of the first and second plane surfaces of the main body portion 16. Alternatively, the construction and/or configuration of the main body portion 16 of the apparatus 10 can be other than illustrated and described if so desired.

In the illustrated embodiment as shown in FIG. 7, one apparatus 10 may be releasably and reliably connected to another apparatus 10 by a snap-fit engagement of the associated connecting portions to the connection portions thereof. FIG. 8 illustrates four apparatuses 10 connected together which provide three slots or openings, indicated generally at 38, there between for receiving a respective media case or box (not shown) therein. Also as shown in FIG. 7, the pair of detents provides for two different connection points to thereby accommodate two different widths of media cases or boxes disposed within the respective apparatus 10. Alternatively, the construction and/or configuration of the apparatus 10 can be other than illustrated and described if so desired. For example, different kinds or types of "connecting" means may be provided to releasably connect two or more apparatuses together, such as other kinds or types of snap-fit arrangements and/or non-snap fit arrangements, like friction fit arrangements can be used so long as they releasably and reliably secure two or more apparatuses 10 together; two or more apparatuses may be connected together only at one of the first and second wall instead of both as shown in the illustrated embodiment; the shape or configuration of the apparatus can be other than illustrated and described; and/or the shape, location, number and/or the configuration of the illustrated associated connecting means can be other than illustrated and described, if so desired.

Referring now to FIGS. 9-13, there is illustrated a fourth embodiment of an apparatus, indicated generally at 70, which when is connected to at least one similar constructed apparatus 70, provides a modular storage rack unit which is configured to store different kinds and types of media cases and boxes in accordance with the present invention. As shown in this embodiment, the apparatus 70 is generally rectangular shaped and can include pairs of female connection portions 72 provided on first and second walls or sides thereof (e.g., a first or upper wall 74 and a second or lower wall 76), which are adapted to receive pairs of male connecting portions 78 provided on adjacent walls or sides of an associated apparatus FIG. 13, by suitable means, such as preferably in a snap-fit arrangement or alternatively in a friction fit arrangement.

Alternatively, the construction and/or configuration of the apparatus 70 can be other than illustrated and described if so desired. For example, different kinds or types of "connecting" means may be provided to releasably connect two or more apparatuses together, such as other kinds or types of snap-fit arrangements and/or non-snap fit arrangements, like friction fit arrangements can be used so long as they releasably and reliably secure two or more apparatuses 70 together; two or more apparatuses may be connected together only at one of the first and second walls instead of both as shown in the illustrated embodiment; the shape or configuration of the apparatus can be other than illustrated and described; and/or the shape, location, number and/or the configuration of the illustrated associated connecting means can be other than illustrated and described, if so desired.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. An apparatus configured to store media cases and boxes comprising:
    at least two similar constructed apparatuses which are releasably connected together by at least one pair of mating connecting means;
    wherein each of the apparatuses includes a pair of side walls and generally triangular shaped main body portion connecting the side walls together, the pair of side walls extending generally perpendicular to the main body portion, the main body portion having a generally centrally located generally triangular shaped opening provided therein, the main body portion defining a first plane surface on a first side thereof and a second plane surface defined on a second side thereof which is generally parallel to the first plane surface;
    wherein each of the apparatuses includes a spring biased deflectable retention tab extending from the main body portion and into the opening, the spring biased deflectable retention tab having a raised protuberance provided on a portion thereof which extends outwardly and beyond one of the first and second plane surfaces of the main body portion whereby the protuberance is configured to engage and assist in holding the associated media cases and boxes within the apparatus during movement thereof; and
    wherein the at least one pair of mating connecting means is provided on at least one of a same pair of the side walls of each of the apparatuses.

2. The apparatus of claim 1 wherein the apparatus is a freestanding apparatus and is configured to stand horizontally or vertically.

3. The apparatus of claim 1 wherein the at least one pair of mating connecting means includes a pair of mating female snap-lock and male snap-lock portions.

4. The apparatus of claim 1 wherein the at least one pair of mating connecting means is configured to accommodate at least two different widths of media cases and boxes.

5. The apparatus of claim 1 wherein a first pair of mating means is provided on a first one of the pair of side walls and a second pair of mating connecting means is provided on a second one of the pair of side walls.

6. The apparatus of claim 1 wherein the at least one pair of mating connecting means includes at least one recess and at least one raised tab configured to mate therewith.

7. The apparatus of claim 1 wherein the protuberance provided on the spring biased deflectable retention tab is provided near a remote end thereof.

8. An apparatus configured to store media cases and boxes comprising:
    at least two similar constructed apparatuses which are releasably connected together by at least one pair of mating connecting means;
    wherein each of the apparatuses includes a pair of side walls and generally triangular shaped main body portion connecting the side walls together, the pair of side walls extending generally perpendicular to the main body portion, the main body portion having a generally centrally located generally triangular shaped opening provided therein, the main body portion defining a first plane surface on a first side thereof and a second plane surface defined on a second side thereof which is generally parallel to the first plane surface;

wherein each of the apparatuses includes a spring biased deflectable retention tab extending from the main body portion and into the opening, the spring biased deflectable retention tab having a raised protuberance provided on a portion thereof which extends outwardly and beyond one of the first and second plane surfaces of the main body portion whereby the protuberance is configured to engage and assist in holding the associated media cases and boxes within the apparatus during movement thereof;

wherein the at least one pair of mating connecting means is provided on at least one of a same pair of the side walls of each of the apparatuses;

wherein the at least one pair of mating connecting means includes a pair of mating female snap-lock and male snap lock portions; and wherein the at least one pair of mating connecting means is configured to accommodate at least two different widths of media cases and boxes.

9. The apparatus of claim 8 wherein the apparatus is a freestanding apparatus and is configured to stand horizontally or vertically.

10. The apparatus of claim 8 wherein a first pair of mating means is provided on a first one of the pair of side walls and a second pair of mating connecting means is provided on a second one of the pair of side walls.

11. The apparatus of claim 8 wherein the at least one pair of mating connecting means includes at least one recess and at least one raised tab configured to mate therewith.

12. The apparatus of claim 8 wherein the protuberance provided on the spring biased deflectable retention tab is provided near a remote end thereof.

13. An apparatus configured to store media cases and boxes comprising:

at least two similar constructed apparatuses formed from a plastic material and which are releasably connected together by at least one pair of mating connecting means;

wherein each of the apparatuses includes a pair of side walls and generally triangular shaped main body portion connecting the side walls together, the pair of side walls extending generally perpendicular to the main body portion, the main body portion having a generally centrally located generally triangular shaped opening provided therein, the main body portion defining a first plane surface on a first side thereof and a second plane surface defined on a second side thereof which is generally parallel to the first plane surface;

wherein each of the apparatuses includes a spring biased deflectable retention tab extending from the main body portion and into the opening, the spring biased deflectable retention tab having a raised protuberance provided on a portion thereof which extends outwardly and beyond one of the first and second plane surfaces of the main body portion whereby the protuberance is configured to engage and assist in holding the associated media cases and boxes within the apparatus during movement thereof;

wherein the at least one pair of mating connecting means is provided on at least one of a same pair of the side walls of each of the apparatuses; and wherein the at least one pair of mating connecting means is configured to accommodate at least two different widths of media cases and boxes.

14. The apparatus of claim 13 wherein the apparatus is a freestanding apparatus and is configured to stand horizontally or vertically.

15. The apparatus of claim 13 wherein the at least one pair of mating connecting means includes a pair of mating female snap-lock and male snap-lock portions.

16. The apparatus of claim 13 wherein a first pair of mating means is provided on a first one of the pair of side walls and a second pair of mating connecting means is provided on a second one of the pair of side walls.

17. The apparatus of claim 13 wherein the at least one pair of mating connecting means includes at least one recess and at least one raised tab configured to mate therewith.

18. The apparatus of claim 13 wherein the protuberance provided on the spring biased deflectable retention tab is provided near a remote end thereof.

\* \* \* \* \*